UNITED STATES PATENT OFFICE.

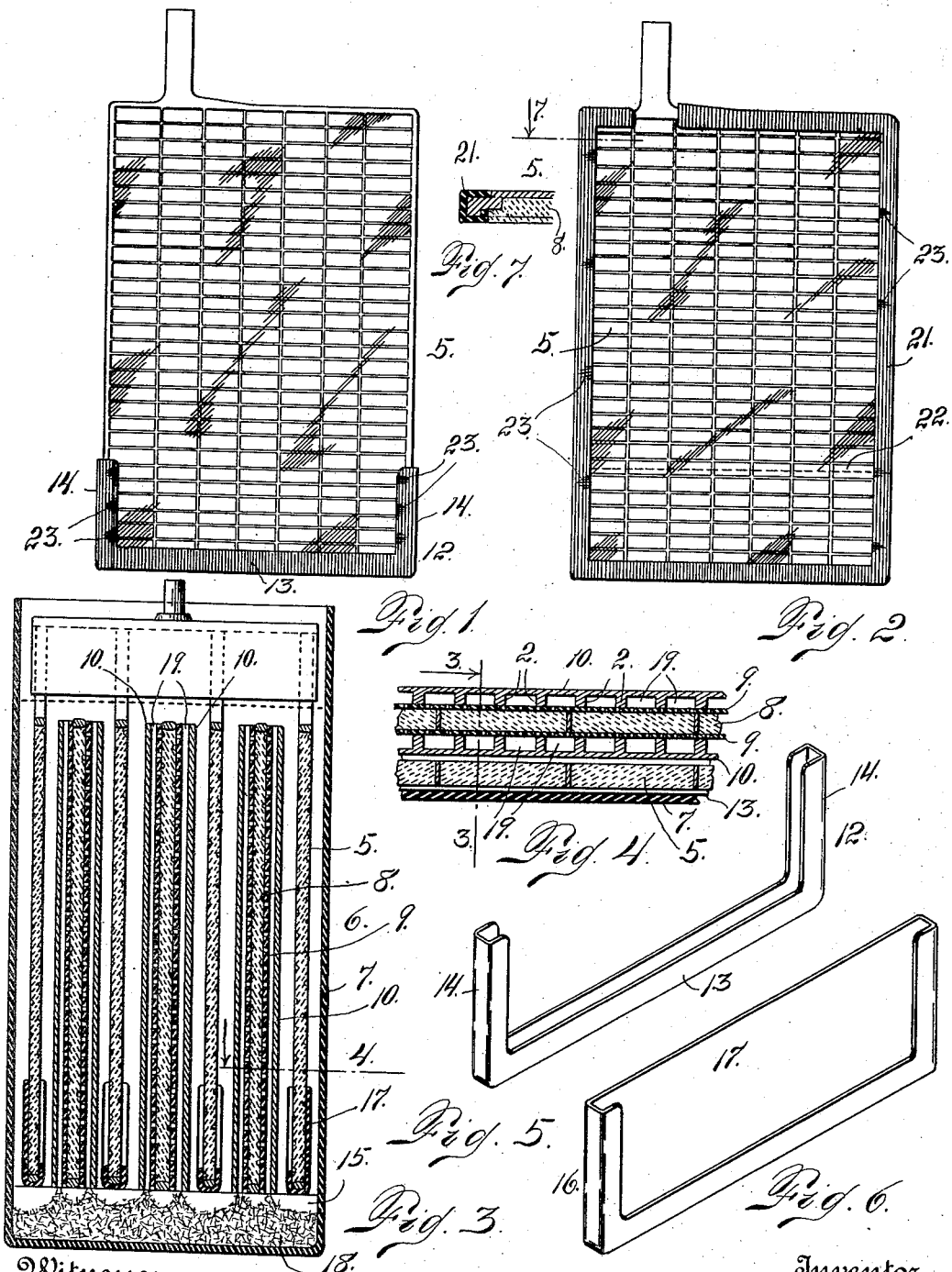

JASPER N. DAVIS, OF DENVER, COLORADO.

STORAGE-BATTERY INSULATION.

1,088,210.

Specification of Letters Patent.

Patented Feb. 24, 1914.

Application filed May 27, 1912. Serial No. 700,002.

*To all whom it may concern:*

Be it known that I, JASPER NEWTON DAVIS, citizen of the United States, residing in the city and county of Denver and State of Colorado, have invented certain new and useful Improvements in Storage-Battery Insulation; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in storage battery insulation, my object being to provide a construction to prevent short-circuiting of the cells between the positive and negative plates. In batteries of this character the positive and negative plates are composed of a sort of grid or foraminated plate constructed to contain a filling of active material, the filling of the negative plate consisting of litharge, and that of the positive plate of peroxid of lead. These plates when so prepared are assembled in cells and formed into a complete battery in the well-known manner. During the constant use and charging of the battery, the positive plates deteriorate by the sloughing off of their active material which falls down and accumulates in the space in the bottom of the jar therefor. As this disintegrated material accumulates, the spaces between the supporting members located in the lower part of the jar, are filled up to the elements, then the active material makes contact with the grids of the positive and negative plates of the cells in the battery which short-circuits the positive and negative elements of the cells, with the result that local action takes place and the energy stored in the elements of the cells when charged, is gradually discharged and the battery as a whole does not give its full output of energy on such charge.

My improvement consists in applying an insulating binding to the edges of the negative plates. This binding may be applied in the case of old batteries to the lower portions only of the negative plates when the battery is being cleaned or repaired, thus preventing said accumulated, disintegrated, active material to make contact with the grid of the positive plates which would, to a great extent, bring it into active use again. Hence, by the use of my improvement, I increase and maintain the capacity and life of the battery. In the case of new batteries it is preferable to apply the insulating binding to the entire outer edge of the grid when the grid is manufactured and before the grid is pasted with the negative active material, the said binding surrounding the entire grid and preventing short-circuiting between any portions of the positive and negative plates.

It is preferred in the case of the outside negative plates of each cell in the battery, to have the insulator extend entirely across the plates on the outside, up to a sufficient height to prevent the disintegrated material from the positive plates, from filling in between the wall of the jar and casing the cell to be short-circuited at this point.

Having briefly outlined my improved construction, I will proceed to describe the same in detail, reference being made to the accompanying drawing, in which is illustrated an embodiment thereof.

In this drawing: Figure 1 is a detail view of a negative plate of a storage battery with my improvement applied to the lower portion thereof. Fig. 2 is a similar view showing the insulating material extending entirely around the edge of the negative member of the battery, being permanently secured to the grid in the manufacture of the latter. Fig. 3 is a cross-section taken through the battery on the line 3—3 Fig. 4. Fig. 4 is a horizontal section taken on the line 4 Fig. 3. Fig. 5 is a perspective view in detail of the insulating binding adapted to be applied to the lower extremities of the intermediate negative plates of the battery. Fig. 6 is a similar view of the insulating member adapted to be applied to the outermost negative plates on opposite sides of the elements. Fig. 7 is a fragmentary section of a grid cutting the insulated edge thereof and illustrating the manner of applying the insulating substance. This is a section taken on the line 7 Fig. 2.

The same reference characters indicate the same parts in all the views.

Let the numeral 5 designate the negative plates of a cell of a storage battery which is designated in its entirety by the numeral 6. This cell is composed of a jar 7 inclosing a number of negative and positive plates, the positive plates being designated by the numeral 8. To the opposite sides of each positive plate are applied perforated insulating plates 9, while outside of each insulating plate is a member 10 provided with longitudinally disposed separated ribs 2.

Referring to Fig. 3 of the drawing, it should be explained that the spaces left between the positive plates 8, and the negative elements 5, are exaggerated, in order to more clearly illustrate my insulating feature. In this figure, the insulating binding is applied to the lower extremities only of the negative plates. This binding, where applied to the intermediate plates of the cells, consists of U-shaped insulating members 12 which are grooved to receive the plate, the said members consisting of a bottom part 13 and upright parts 14. When applied to the lower extremity of the negative plate, the member 12 engages the lower edge thereof, where it rests upon the partitions 15 located in the bottom of the jar. The parts 14 of this member also engage the opposite vertical edges of the plate for a considerable distance above the partitions 15. In the case of the outermost negative plates 5, insulating members 16 are employed. These members are similar to the members 12 except that there is a part 17 which extends across the negative element on the outside, the same being of a height equal to the vertical parts of the members 12.

As illustrated in the drawing, the bottom of the jar is provided with a quantity of active material 18 which has sloughed off from the positive plates 8 of the cell during the charging and discharging of the latter when in use. This material, as it disintegrates, due to the chemical action of the cells, passes through the perforations of the insulating plates 9 and thence downwardly through the channels 19, between the ribs 2 of the wood-members 10. As this material 18 accumulates and fills up to and touches the bottoms of the plates, it will form an electrical connection between the positive and negative plates of the cell which results, as heretofore explained, in the short-circuiting of the cell, with the result that the latter will discharge itself.

In the making of new batteries, it is preferred that an insulating binding, designated in Fig. 2 by the numeral 21, shall extend entirely around the outer free edge of each negative plate (see Fig. 2).

In the case of the outside plates, the insulating binding should extend entirely across the plate on the outside for a distance equal in height to the distance between the lower edge of the plate and the dotted line 22, in Fig. 2.

As the construction of the battery in respects other than my improved means to prevent short-circuiting of the cells between the positive and negative plates, is the same as in batteries heretofore in use, it will not be necessary to describe the battery in detail. It should be explained, however, that the insulating binding applied to the negative plates is composed of such material that it may be caused to adhere to the plates by clamping the same thereon by means of nippers or gripping devices of any kind which may be applied to this binding at suitable intervals, as indicated at 23 in Figs. 1 and 2. By pressing this binding tightly on opposite sides, the rubber or other material used for the purpose may be pressed into the spaces between the bars of the grid, thus making the binding self-retaining upon the negative plates of the cells.

Referring to the insulating material as applied to the construction disclosed in Fig. 2 where the insulating binding or armor extends entirely around the outer or free edge of the grid, attention is called to the fact that this binding should be so applied by clamping it to and into the grid as to protect this part of the grid from contact with the battery solution. Any suitable means may be employed in connection with the binding for protecting the free edge of the grid against the corrosive action of the battery solution. This is important particularly with reference to the upper end of the grid, since, if the battery solution comes in contact with this part of the grid, it results in an expansion or outward swelling of the grid, this phenomenon being termed, in the vernacular of the trade, as "moss-growing." This expansion of the upper extremity of the grid is frequently of such magnitude as to cause the grid to come in contact with the pillar-strap of the positive element of the cell, resulting in short-circuiting the elements of the cell. My object is to prevent this result, and the insulating binding, when properly applied, will overcome the difficulty.

Instead of using an insulating binding already prepared, a liquid or semi-liquid enamel may be applied to the edge of the grid to insulate the latter, after which the said enamel is hardened to retain it in place.

The insulation applied to the edge of the grid should be flush with the body of the grid (see Fig. 7). In this event the grid should be made of special construction.

In applying the enamel in liquid or semi-liquid form, a better opportunity is given for protecting the edge of the grid against the action of the battery solution than when the binding is completely formed before applying it to the grid.

Having thus described my invention, what I claim is:

In a storage battery grid, an edge bar having a rabbet on one side, substantially channel shaped insulation into which said edge bar fits tightly, and with which it forms a close union at all adjacent points, one flange of said insulation being turned inwardly at right angles to engage said rabbet to hold the insulation firmly in place, whereby the edge bar is protected from battery solution.

In testimony whereof I affix my signature in presence of two witnesses.

JASPER N. DAVIS.

Witnesses:
A. J. O'Brien,
A. M. Nelson.